United States Patent [19]
White et al.

[11] Patent Number: 5,453,798
[45] Date of Patent: Sep. 26, 1995

[54] BLACK COMPENSATION CIRCUIT FOR A VIDEO DISPLAY SYSTEM

[75] Inventors: Charles M. White, Noblesville; Thomas D. Gurley, Indianapolis, both of Ind.

[73] Assignee: Thomson Consumer Electronics, Inc., Indianapolis, Ind.

[21] Appl. No.: 14,156

[22] Filed: Feb. 5, 1993

[51] Int. Cl.[6] ................................................ H04N 9/72
[52] U.S. Cl. ........................................ 348/692; 348/691
[58] Field of Search ............................ 358/171, 168, 358/167; 348/691, 692, 696, 697, 698, 687, 688, 689, 678, 679, 686, 695; H04N 5/16, 5/57, 5/18, 9/72

[56] References Cited

U.S. PATENT DOCUMENTS

| | | | |
|---|---|---|---|
| 3,947,631 | 3/1976 | Rhee | 358/168 |
| 4,118,731 | 10/1978 | Hinn | 358/65 |
| 4,691,235 | 9/1987 | Okui | 358/168 |
| 4,811,101 | 3/1989 | Yagi | 358/171 |
| 5,083,198 | 1/1992 | Haferl et al. | 358/32 |
| 5,162,902 | 11/1992 | Bell | 358/168 |
| 5,223,927 | 6/1993 | Kagayama | 358/168 |
| 5,339,114 | 8/1994 | Lagoni et al. | 358/183 |

FOREIGN PATENT DOCUMENTS

| | | | |
|---|---|---|---|
| 52-55321 | 5/1977 | Japan | H04N/5/44 |
| 59-61378 | 7/1984 | Japan | H04N/5/48 |
| 0087591 | 5/1985 | Japan | 358/168 |
| 4-373389 | 12/1992 | Japan | H04N/9/64 |
| 2091978 | 8/1982 | United Kingdom | H04N/5/18 |
| 2149269 | 6/1985 | United Kingdom | H03G/1/00 |

*Primary Examiner*—James J. Groody
*Assistant Examiner*—Chris Grant
*Attorney, Agent, or Firm*—Joseph S. Tripoli; Peter M. Emanuel

[57] ABSTRACT

A driver for a cathode ray tube includes a black level compensation circuit which generates an offset voltage which tracks the current flowing to the output of the driver and therefore the average picture level (APL). The offset voltage is added as a component of the output voltage so as to increasingly shift the output voltage toward black as the APL increases. This compensates for CRT gamma non-linearities and for light scattering effects which might otherwise cause the loss of perceived detail and sharpness in dark areas of a high APL image. In the disclosed embodiment, the driver comprises a cascode amplifier and the offset voltage generating element includes a capacitively bypassed resistor connected in a reference voltage network connected to the emitter circuit of the lower (common emitter configured) transistor of the cascode amplilfier.

8 Claims, 1 Drawing Sheet

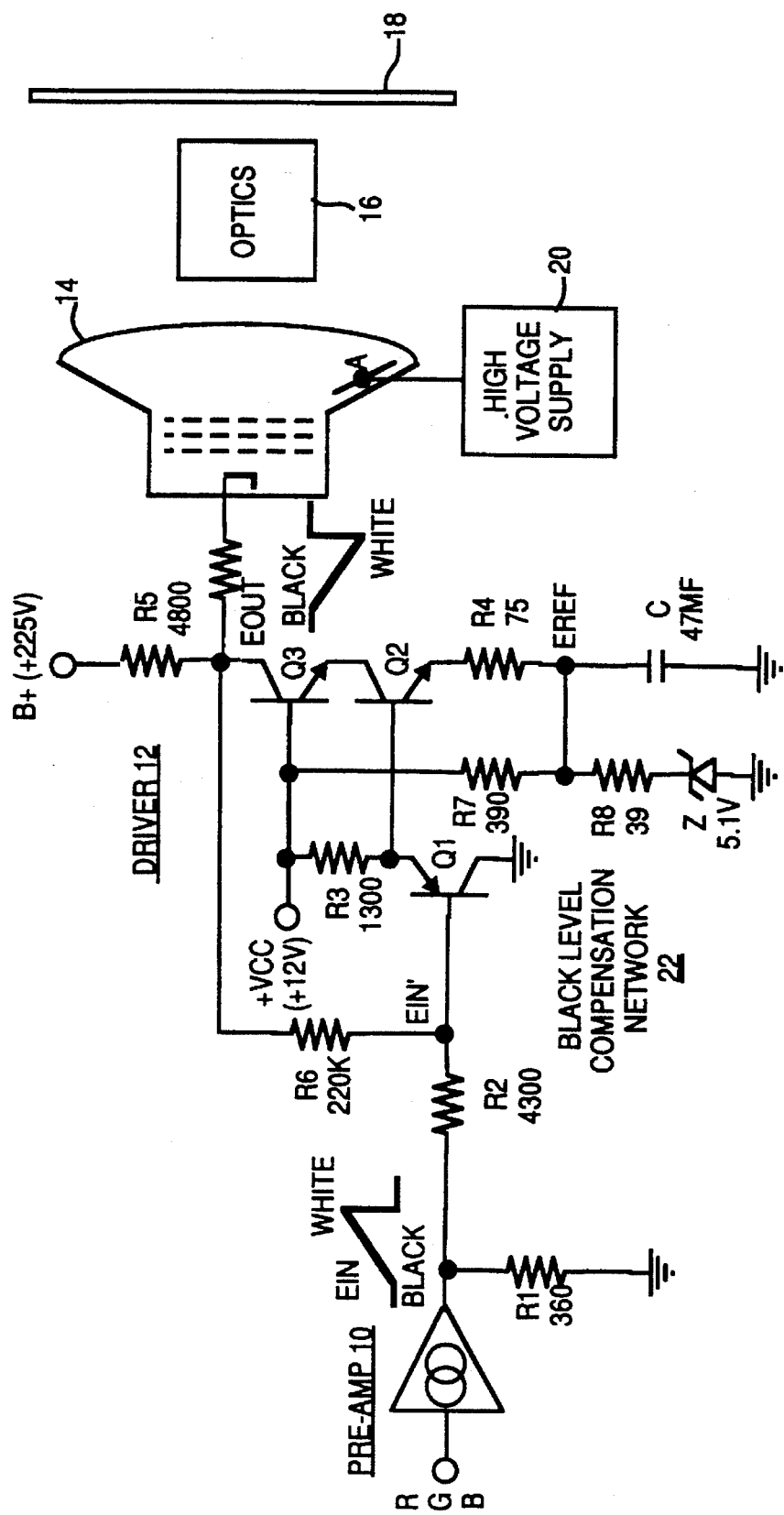

BLACK COMPENSATION CIRCUIT FOR A VIDEO DISPLAY SYSTEM

FIELD OF THE INVENTION

The invention concerns an arrangement for driving a display device, such as a cathode ray tube (CRT), with provisions for automatically adjusting the black level of a reproduced image as a function of the average picture level of the image.

BACKGROUND OF THE INVENTION

In television receivers, especially projection type television receivers, management of the black level of the reproduced image is critical to maintaining perceived detail and sharpness in dark image portions. Unfortunately, the electro-optic characteristics of the CRT itself, and in the case of projection type television receiver, the optical system itself, interferes with the faithful reproduction of dark image portion. This is primarily due to the non-linearity or "gamma" of the CRT, and also to light scattering effects, especially in a projection television receiver.

Gamma refers to the non-linear voltage drive to light output of the CRT. When the television transmission standard was originally defined, television cameras were designed to have a complimentary gamma function to that of CRTs so that the overall transmission system from camera light input to CRT light output was linear. However, as time went on, CRTs were designed for more and more light output, resulting in a in a different (higher) gamma than the one of earlier CRTs. Cameras, however continue to conform more or less to the original defined gamma characteristics for television cameras. Thus, the modern television receivers exhibit a non-linear light output characteristic relative to the original scene scanned by the television camera. The result of this mis-match in gammas between the camera and the CRT is that low level luminance scenes are displayed with less contrast than the original scene and high level luminance scenes with more contrast than the original scene.

Unnaturally high contrast areas of the picture are rarely complained about. However, there may be a loss of perceived detail and sharpness in low light areas having unnaturally low contrast. This situation could be corrected by adding gamma correction circuitry to the television receiver to bring the effective gamma of the television receiver back closer to the one contemplated by the original television transmission standard. However, this is rarely done because of circuit complexity and cost. In addition, gamma correction tends to enhance noise in the low light areas of the reproduced image relative to an arrangement without gamma correction. This results because noise introduced in the transmission path is amplified by the gamma corrector.

The second phenomena which adversely affects perceived low light area image detail and sharpness, light-scattering, is due to light from high light areas spilling into all areas causing black areas to appear less black. With images having a significant high light image portion i.e., images with a so called high average picture level (APL), light scattering may result in loss of detail in dark areas. Light scattering is typically a more severe problem in a projection television systems due to their optics.

SUMMARY OF THE INVENTION

In accordance with an aspect of the invention, it is recognized that one relatively simple way of reducing the objectionable effects from both uncorrected gamma of the CRT and light-scattering, is to cause black levels to become "more black" when the image has a high APL and to become less black (whiter) when the image has a low APL. This has the effect of restoring perceived detail and sharpness in dark areas of an image with a high APL in which light-scattering would otherwise tend to "wash out" the dark area details. This technique also tends to shift low light images up in light level so that contrast in these scenes is less compressed by the non-linear gamma characteristics of the CRT.

Another aspect of invention concerns the manner in which the above described technique may be simply implemented in the CRT drive stage, as shown by way of example in the sole Figure of the accompanying Drawing.

BRIEF DESCRIPTION OF THE DRAWING

The sole Figure is a schematic of the video output section of a projection television system including a black level compensation arrangement constructed in accordance with the invention.

DETAILED DESCRIPTION OF THE DRAWING

The output section shown in the sole Figure is one of three such sections employed in a projection television system, each for developing an image corresponding to a respective one of a red (R), green (G) or blue (B) video signal. The other two sections are not shown since they are are substantially identical to the one which is shown. Typical component values and voltages are indicated in the Figure by way of example. Resistor values are in ohms unless otherwise indicated. The letter "K" stands for kilohms and the letters "MF" stand for microfarads.

A processed video signal (either red, green or blue) in the form of a voltage is coupled to the input of a preamplifier 10. Preamplifier 10 is a current amplifier which converts the video input voltage to a corresponding output current. The output current is in turn converted to an input voltage EIN for video output amplifier or CRT driver 12 by a terminating resistor R1. CRT driver 12 amplifies the relatively low input voltage EIN to produce a relatively high level output voltage EOUT which is coupled to the cathode of a projection CRT 14. The light output of CRT 14 is transmitted by an optics section 16 to a screen 18, where it is combined with the light outputs of the other two output sections to display a composite color image. A high voltage stage 20 provides a very high supply voltage to the anode of CRT 14, as well as relatively lower voltages to various grids of CRT 14.

Driver 12 comprises an emitter-follower amplifier including PNP transistor Q1 and a cascode amplifier including NPN transistors Q2 and Q3 and. Input voltage EIN is coupled by a resistor R2 to the base of transistor Q1, where a voltage EIN is developed. The emitter of transistor Q1 is coupled to the base of transistor Q2. A resistor R3 coupled between the emitter of transistor Q1 and a source of supply voltage +VCC serves as a load resistor for emitter-follower configured transistor Q1. Transistor Q2 is configured as a common emitter amplifier, providing an output current at its collector which is coupled to the emitter of transistor Q3. Resistor R4 is coupled between the emitter of transistor Q2 and a black level compensation network 22 which develops a reference voltage EREF dependent on the average picture level, as will be described in detail below. Transistor Q3 is configured as a common base amplifier, having supply voltage +VCC coupled to its base and providing the output voltage EOUT at its collector. Output voltage EOUT is developed across a load, represented simply as a resistor R5, connected between the collector of transistor Q3 and a source of supply voltage B+. It will be appreciated by those skilled in the art that the load of driver 12 may be more complex and may include active devices. For example the load of driver 12 may comprise complementary transistors configured as respective emitter-follower amplifiers and connected in a "push-pull" arrangement. Resistor R6 is coupled between the output of driver 12 at the collector of transistor Q3 and the base of transistor Q1, and together with resistor R2 provides negative feedback to the input of driver 12. The overall gain of driver 12 is primarily set by resistors R2, R4, R5 and R6.

Black level compensation network 22 comprises a resistor R7, a resistor R8 and a Zener diode Z connected in series between the source of supply voltage +VCC and a point of signal ground, and a filter capacitor C connected in parallel with the series combination of resistor R8 and Zener diode Z. Reference voltage EREF is the sum of the Zener voltage developed by Zener diode Z and the voltage developed across resistor RS. The voltage developed by Zener diode Z establishes a nominal value for reference voltage EREF. The current which flows through resistor R8 is primarily provided from the output of driver 12 through transistors Q2 and Q3 and resistor R4. Capacitor C removes the AC signal component from reference voltage EREF. The current provided from the output of driver 12, and which flows through resistor RS, increases as the as the average picture level (APL) increases and image becomes lighter, and decreases as the APL decreases and the image becomes darker. Thus, reference voltage EREF increases as the APL increases and decreases as the APL decreases.

The output voltage EOUT is approximately expressed as;

$$EOUT=(B+)-(EIN'-EREF)(R5/R4)$$

Accordingly, voltage EOUT increases as the APL and voltage EREF increase. This causes CRT 14 to move closer cut off and thereby makes the black level more black. Thus, the possibility of the loss of perceived detail and sharpness in dark portions of a high APL image due the gamma non-linearity of CRT 14 and the light scattering produced by optics 16 and screen 18 are reduced. Conversely, voltage EOUT decreases as the APL and voltage EREF decrease. This causes CRT 14 to move away from cut off and thereby makes the black level less black.

Black level compensation network 22 operates by generating a black level offset voltage, (EREF)(R5/R4), which is responsive to the current flowing in driver 12, and therefore the APL, and which is coupled to the output of driver 12 so as to be a component of output voltage EOUT. While the black level is changed, there is no corresponding change of the AC gain of driver 12 and the linearity of driver 12 is maintained.

While the invention has been described in terms of a projection television system, it is noted that is also useful in a direct view television system. Further, while preamplifier 10 of the described embodiment comprises a current amplifier, it could also comprise a voltage amplifier. Still further, configurations of drivers other than a cascode amplifier may be employed. These and other modifications are intended to be within the scope of the invention defined by the following claims.

We claim:

1. In a video display system having a cathode ray tube for displaying an image, apparatus comprising:

a video output amplifier for amplifying a relatively low level video input signal received at an input of said video output amplifier to produce a relatively high level video output voltage suitable for direct application to a cathode ray tube at an output of said video output amplifier;

means coupled to an output current path of said video output amplifier for generating a reference voltage in response to the current flowing in said current path and representative of the average picture level of said image; and means for coupling an offset signal responsive to said reference voltage to said output of said video output amplifier.

2. The apparatus recited in claim 1, wherein:

said video output amplifier includes a transistor having a current path between first and second electrodes, and a control electrode for controlling the conduction of said current path, said video input signal being coupled to said control electrode, the second electrode being coupled to said output of said video output amplifier; and said means for generating said reference voltage includes a DC impedance element and a low pass filter element, and means for coupling said DC impedance element to said first electrode.

3. The apparatus recited in claim 2, wherein:

said means for coupling said offset signal to said output of said video output amplifier comprises said means for coupling said impedance element to said first electrode.

4. The apparatus recited in claim 3, wherein:

said video output amplifier includes a second transistor having a current path between first and second electrodes, and a control electrode for controlling the conduction of said current path, a DC voltage being coupled to said control electrode of said second transistor, said second electrode of said second transistor being coupled to said output of said video output amplifier, and said second electrode of said first mentioned transistor being coupled to said first electrode of said second transistor and thereby being coupled by said current of said second transistor to said output of said video output amplifier.

5. The apparatus recited in claim 2, wherein:

said means for generating said reference voltage further includes means for providing a fixed DC voltage, said DC impedance being coupled in a series path with said means for providing said fixed DC voltage; and said low pass filter element is coupled in parallel with said series path.

6. The apparatus recited in claim 5, wherein:

said means for coupling said DC impedance element to said first electrode comprises a second DC impedance element.

7. The apparatus recited in claim 6, wherein:

said first mentioned DC impedance element comprises a first resistor; said means for providing said fixed DC voltage comprises a Zener diode; said low pass filter element comprises a capacitor; and said second DC impedance element comprises a second resistor coupled in series between said first resistor and said first electrode.

8. In a video system, apparatus comprising:

a video amplifier for amplifying a video input signal received at an input to produce a video output signal representative of an image at an output;

said video amplifier including a transistor having a current path between first and second electrodes, and a control electrode for controlling the conduction of said current path, said video input signal being coupled to said control electrode, the second electrode being coupled to said output of said video output amplifier;

means coupled to an output current path of said video amplifier for generating a reference signal in response to the current flowing in said current path and representative of the average picture level of said image;

said means for generating said reference signal including a DC impedance element and a low pass filter element, and means for coupling said DC impedance element to said first electrode of said transistor; and means for coupling an offset signal corresponding to said reference signal to said output of said video output amplifier.

* * * * *